US011558291B2

(12) United States Patent
Chen

(10) Patent No.: US 11,558,291 B2
(45) Date of Patent: Jan. 17, 2023

(54) ROUTING PROTOCOL BROADCAST LINK EXTENSIONS

(71) Applicant: Futurewei Technologies, Inc., Plano, TX (US)

(72) Inventor: Huaimo Chen, Bolton, MA (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

(21) Appl. No.: 15/901,494

(22) Filed: Feb. 21, 2018

(65) Prior Publication Data

US 2018/0262426 A1 Sep. 13, 2018

Related U.S. Application Data

(60) Provisional application No. 62/469,686, filed on Mar. 10, 2017, provisional application No. 62/469,692, filed on Mar. 10, 2017.

(51) Int. Cl.
*H04L 12/42* (2006.01)
*H04L 45/52* (2022.01)
*H04L 45/24* (2022.01)
*H04L 45/60* (2022.01)
(Continued)

(52) U.S. Cl.
CPC ............. *H04L 45/52* (2013.01); *H04L 45/04* (2013.01); *H04L 45/12* (2013.01); *H04L 45/24* (2013.01); *H04L 45/60* (2013.01)

(58) Field of Classification Search
CPC ......... H04L 45/04; H04L 45/12; H04L 45/24; H04L 45/52; H04L 45/60
See application file for complete search history.

(56) References Cited

U.S. PATENT DOCUMENTS 8,125,926 B1 * 2/2012 Kompella ............... H04L 45/00
370/254
2003/0193944 A1 * 10/2003 Sasagawa ............... H04L 45/50
370/428

(Continued)

OTHER PUBLICATIONS

Callon, "Use of OSI IS-IS for Routing in TCP/IP and Dual Environments," RFC 1195, Dec. 1990, 85 pages.
(Continued)

*Primary Examiner* — Khaled M Kassim
*Assistant Examiner* — Zhaohui Yang
(74) *Attorney, Agent, or Firm* — Conley Rose, P.C.

(57) ABSTRACT

A first router in a first AS, the first router comprises: a processor configured to: obtain information about a broadcast link connecting the first router to a second router in a second AS, and generate a link state message comprising the information; and a transmitter coupled to the processor and configured to transmit the link state message to a third router, wherein the third router is in the first AS and is adjacent to the first router. A method comprises: receiving a first link state message from a first router; receiving a second link state message from a second router; receiving a third link state message from a third router; determining which of the first router, the second router, and the third router are ASBRs connected to a broadcast link based on information in the first link state message, the second link state message, and the third link state message.

20 Claims, 13 Drawing Sheets

(51) Int. Cl.
   *H04L 45/12* (2022.01)
   *H04L 45/02* (2022.01)

(56) References Cited

U.S. PATENT DOCUMENTS

| | | | | |
|---|---|---|---|---|
| 2008/0205401 A1* | 8/2008 | Mirtorabi | .......... | H04L 29/12028 370/392 |
| 2009/0274159 A1* | 11/2009 | Xia | .......... | H04L 45/02 370/401 |
| 2015/0055652 A1* | 2/2015 | Yong | .......... | H04L 12/184 370/390 |
| 2015/0195178 A1* | 7/2015 | Bhattacharya | .......... | H04L 45/745 718/1 |
| 2016/0261501 A1* | 9/2016 | Hegde | .......... | H04L 45/22 |

OTHER PUBLICATIONS

Chen, et al., "ISIS Extensions for Broadcast Inter-AS TE Link," draft-chen-isis-ias-lk-01, Sep. 11, 2017, 7 pages.

Chen, et al., "ISIS Extensions in Support of Inter-Autonomous System (AS) MPLS and GMPLS Traffic Engineering," RFC 5316, Dec. 2008, 19 pages.

Chen, et al., "OSPF Extensions for Broadcast Inter-AS TE Link," draft-chen-ospf-ias-lk-01, Sep. 11, 2017, 8 pages.

Chen, et al., "OSPF Extensions in Support of Inter-Autonomous System (AS) MPLS and GMPLS Traffic Engineering," RFC 5392, Jan. 2009, 17 pages.

Hawkinson, "Guidelines for Creation, Selection, and Registration of an Autonomous System (AS)," RFC 1930, Mar. 1996, 10 pages.

Ishiguro, et al., "Traffic Engineering Extensions to OSPF Version 3," RFC 5329, Sep. 2008, 12 pages.

Katz, et al., "Traffic Engineering (TE) Extensions to OSPF Version 2," RFC 3630, Sep. 2003, 14 pages.

Kompella, et al., "Link Bundling in MPLS Traffic Engineering (TE)," RFC 4201, Oct. 2005, 12 pages.

Li, et al., "IS-IS Extensions for Traffic Engineering," RFC 5305, Oct. 2008, 17 pages.

Moy, "OSPF Version 2," RFC 2328, Apr. 1998, 244 pages.

\* cited by examiner

Inter-AS TE LSP
400

Inter-AS TE LSA
500

ROUTING PROTOCOL BROADCAST LINK EXTENSIONS

CROSS-REFERENCE TO RELATED APPLICATIONS

This application claims priority to U.S. provisional patent application No. 62/469,686 filed on Mar. 10, 2017 by Futurewei Technologies, Inc. and titled "Intermediate System-to-Intermediate System (ISIS) Extensions for Broadcast Inter-Autonomous System Traffic Engineering (TE) Link," and U.S. provisional patent application No. 62/469,692 filed on Mar. 10, 2017 by Futurewei Technologies, Inc. and titled "Open Shortest Path First (OSPF) Extensions for Broadcast Inter-Autonomous System Traffic Engineering (TE) Link," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Routing protocols specify how routers communicate with each other to distribute information that enables them to determine routes among themselves. Routing protocols include distance-vector routing protocols and link state routing protocols. In distance-vector routing protocols, each router shares its routing table with its neighboring routers. In link state protocols, each router shares its connectivity information with its neighboring routers.

IS-IS and OSPF are both link state routing protocols that implement a Dijkstra algorithm to determine routes. However, IS-IS and OSPF have a few differences. For instance, IS-IS distributes link state information through LSPs, and an IS-IS router originates one or more LSPs that describe links attached to the IS-IS router. OSPF distributes link state information through LSAs, and an OSPF router originates one LSA that describes links connected to the OSPF router. In addition, IS-IS distributes TE information in TLVs added to existing LSPs, while OSPF distributes TE information in new TE LSAs.

SUMMARY

In one embodiment, the disclosure includes a first router in a first AS, the first router comprising: a processor configured to: obtain information about a broadcast link connecting the first router to a second router in a second AS, and generate a link state message comprising the information; and a transmitter coupled to the processor and configured to transmit the link state message to a third router, wherein the third router is in the first AS and is adjacent to the first router. In some embodiments, the information comprises a first sub-TLV, wherein the first sub-TLV comprises: an IP address field indicating a local IP address of a connection to the broadcast link; and a mask length field indicating a length of an IP address mask; the information further comprises a second sub-TLV, and wherein the second sub-TLV comprises a local AS number field indicating a local AS number of the first router; the link state message is an IS-IS LSP; the link state message is an OSPF LSA; the transmitter is further configured to further transmit the link state message to the third router when TE is enabled on the broadcast link; the processor is further configured to flush the link state message in the first AS when TE is disabled on the broadcast link; when TE parameters for the broadcast link have changed: the processor is further configured to generate a new link state message; and the transmitter is further configured to transmit the new link state message to the third router.

In another embodiment, the disclosure includes a method implemented in a first router in a first AS, the method comprising: obtaining information about a broadcast link connecting the first router to a second router in a second AS; generating a link state message comprising the information; and transmitting the link state message to a third router, wherein the third router is in the first AS and is adjacent to the first router. In some embodiments, the information comprises a first sub-TLV, and wherein the first sub-TLV comprises: an IP address field indicating a local IP address of a connection to the broadcast link; and a mask length field indicating a length of an IP address mask; the information further comprises a second sub-TLV, and wherein the second sub-TLV comprises a local AS number field indicating a local AS number of the first router; the link state message is an IS-IS LSP; the link state message is an OSPF LSA; the method further comprises further transmitting the link state message to the third router when TE is enabled on the broadcast link; the method further comprises flushing the link state message in the first AS when TE is disabled on the broadcast link; when TE parameters for the broadcast link have changed, the method further comprises: generating a new link state message; and transmitting the new link state message to the third router.

In yet another embodiment, the disclosure includes a method comprising: receiving a first link state message from a first router; receiving a second link state message from a second router; receiving a third link state message from a third router; and determining which of the first router, the second router, and the third router are ASBRs connected to a broadcast link based on information in the first link state message, the second link state message, and the third link state message. In some embodiments, the information comprises at least one of an IP address field indicating a local IP address of a connection to the broadcast link, a mask length field indicating a length of an IP address mask, or a local AS number field indicating an AS number; the first link state message, the second link state message, and the third link state message are either IS-IS LSPs or OSPF LSAs; the method further comprises designating a DR and a BDR from among the first router, the second router, and the third router; creating a pseudo node system using the first router, the second router, and the third router, wherein the pseudo node system comprises a pseudo node; and computing a routing path using the pseudo node.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
AS: autonomous system
ASBR: AS border router
ASIC: application-specific integrated circuit
BDR: backup DR
CPU: central processing unit
DR: designated router
DSP: digital signal processor
EO: electrical-to-optical
FPGA: field-programmable gate array
ID: identifier
IP: Internet Protocol
IPv4: IP version 4
IPv6: IP version 6
IS-IS: Intermediate System to Intermediate System
LSA: link state advertisement
LSP: link state PDU
OE: optical-to-electrical
OSPF: Open Shortest Path First
PCE: path computation element
PDU: protocol data unit
P2P: point-to-point
RAM: random-access memory
RF: radio frequency
RFC: request for comments
ROM: read-only memory
RX: receiver unit
SDN: software-defined networking
SRAM: static RAM
TCAM: ternary content-addressable memory
TE: traffic engineering
TED: TE database
TLV: type, length, and value
TX: transmitter unit.

Figure 1:
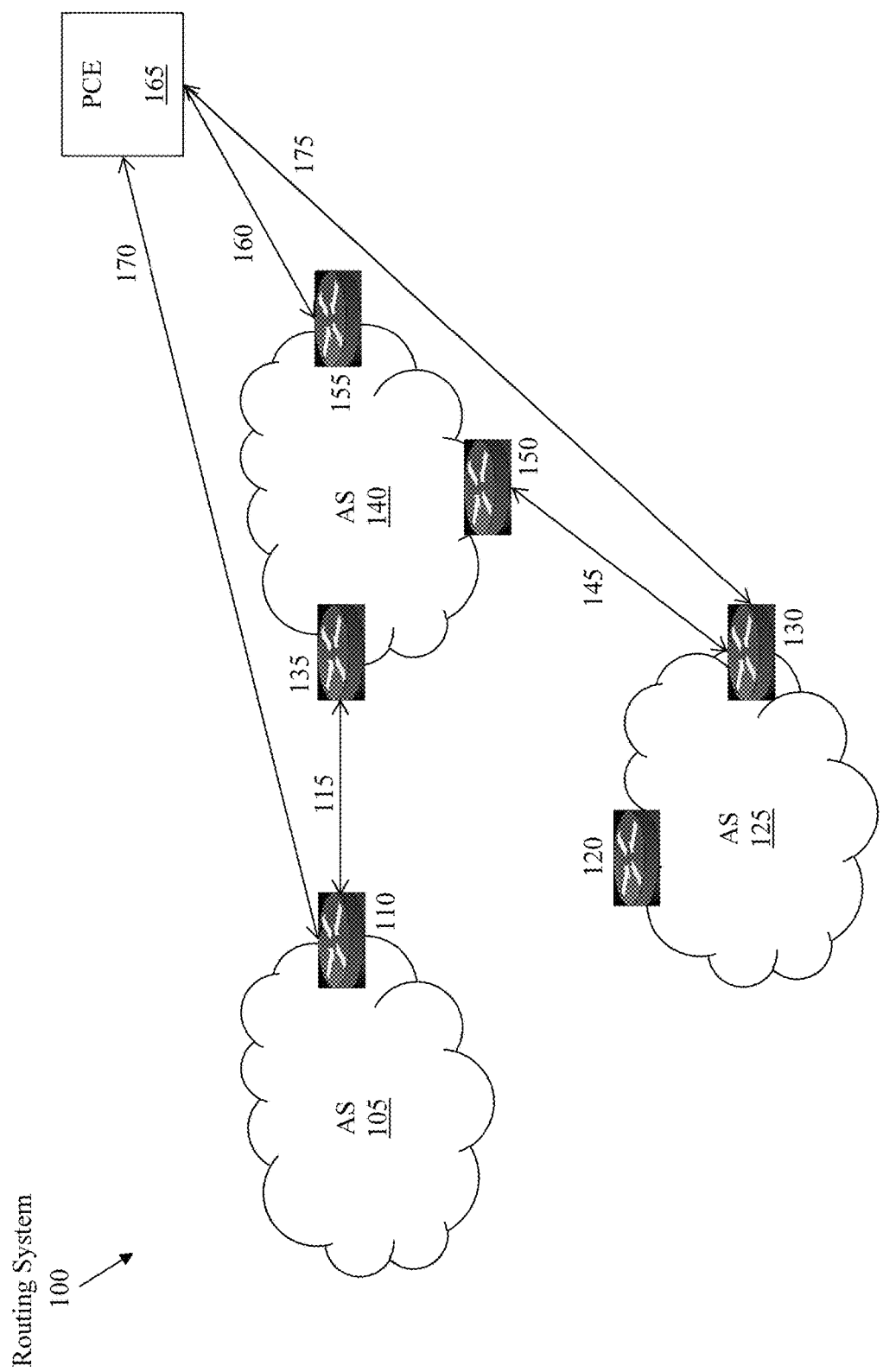
FIG. 1 is a schematic diagram of a routing system.

FIG. 1 is a schematic diagram of a routing system 100. The routing system 100 comprises ASs 105, 125, 140; links 115, 145, 160; and a PCE 165. The routing system 100 may implement IS-IS or OSPF. Each AS 105, 125, 140 appears to the other ASs 105, 125, 140 to have a single, coherent interior routing plan and presents a consistent picture of what networks are reachable through it. The AS 105 comprises a router 110; the AS 125 comprises routers 120, 130; and the AS 140 comprises routers 135, 150, 155. The ASs 105, 125, 140 may further comprise other routers that are not shown.

The routers 110, 120, 130, 135, 150, 155 may be referred to more generally as nodes or more specifically as ASBRs because they are routers at borders of the ASs 105, 125, 140, meaning there are no routers in their ASs 105, 125, 140 that connect them to routers outside their ASs 105, 125, 140. The routers 110, 120, 130, 135, 150, 155 are networking devices that perform traffic directing functions for the routing system 100. The PCE 165 may be referred to more generally as a node or more specifically as a controller such as an SDN controller. The PCE 165 is above and connects to the ASs 105, 125, 140, and the PCE 165 computes TE paths crossing the ASs 105, 125, 140. For those reasons, the PCE 165 may also be referred to as a super node.

The link 115 connects the routers 110, 135 and thus the ASs 105, 140 to each other; the link 145 connects the routers 130, 150 and thus the ASs 125, 140 to each other; the link 160 connects the router 155 and the PCE 165 to each other; the link 170 connects the router 110 and the PCE 165 to each other; and the link 175 connects the router 130 and the PCE 165 to each other. The links 115, 145 may be referred to as P2P inter-AS TE links, and the link 160, 170, 175 may be referred to as P2P links. P2P indicates the links 115, 145, 160, 170, 175 connect two points; inter-AS indicates the links 115, 145 connect two ASs; and TE indicates the links 115, 145 are to be used in TE paths crossing the ASs 105, 125, 140. For instance, the link 115 connects two points, the router 110 and the router 135; connects two ASs, the AS 105 and the AS 140; and is used in a TE path segment from the router 110 to the router 120. A TE link is a logical construct that represents a way to group or map information about physical resources that connect routers.

Previously, IS-IS and OSPF did not provide approaches to advertise P2P inter-AS TE links like the links 115, 145. However, M. Chen, et al., "ISIS Extensions in Support of Inter-Autonomous System (AS) MPLS and GMPLS Traffic Engineering," RFC 5316, December 2008 ("RFC 5316"), which is incorporated by reference, describes how to advertise P2P inter-AS TE links in IS-IS. M. Chen, et al., "OSPF Extensions in Support of Inter-Autonomous System (AS) MPLS and GMPLS Traffic Engineering," RFC 5392, January 2009 ("RFC 5392"), which is incorporated by reference, similarly describes how to advertise P2P inter-AS TE links in OSPF. However, RFC 5316 does not describe how to advertise broadcast inter-AS TE links in IS-IS, and RFC 5392 similarly does not describe how to advertise broadcast inter-AS TE links in OSPF. In addition, it is desirable to make path routing across such broadcast inter-AS TE links more efficient.

Disclosed herein are embodiments for routing protocol broadcast link extensions. The routing protocols are IS-IS, OSPF, or other suitable routing protocols. The broadcast links are broadcast inter-AS TE links or other suitable broadcast links. The extensions comprise advertisement, withdrawal, and re-advertisement of broadcast links, as well as pseudo node implementation. Advertisement and re-advertisement of the broadcast links comprise communicating link state messages. The link state messages comprise sub-TLVs for IP addresses with mask lengths and comprise local AS numbers. The pseudo node implementation comprises creating and using pseudo nodes for more efficient path routing across broadcast inter-AS TE links.

Figure 2:
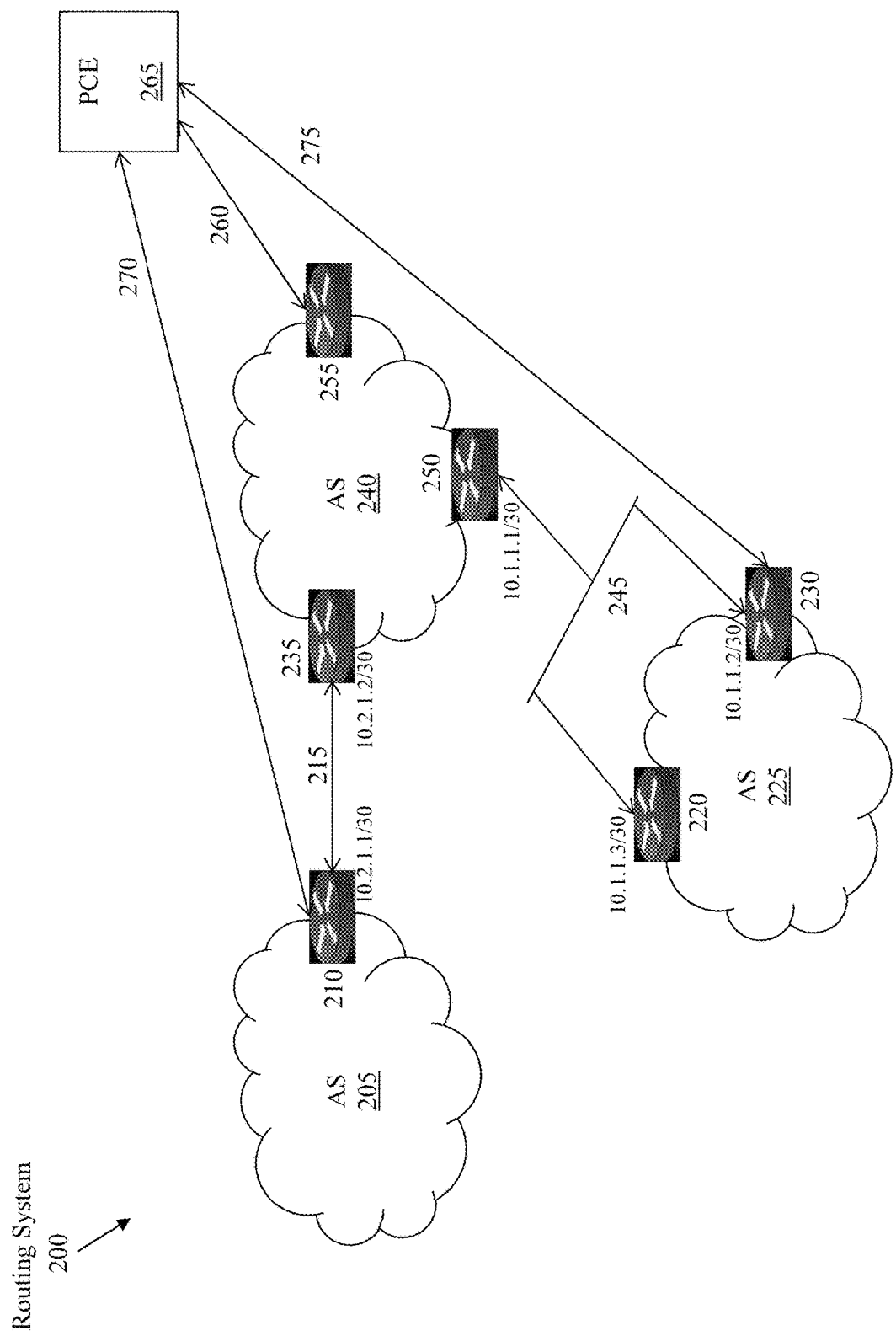
FIG. 2 is a schematic diagram of another routing system according to an embodiment of the disclosure.

FIG. 2 is a schematic diagram of another routing system 200 according to an embodiment of the disclosure. The routing system 200 is similar to the routing system 100 in FIG. 1. Specifically, like the routing system 100, the routing system 200 comprises ASs 205, 225, 240; links 215, 245, 260, 270, 275; and a PCE 265. In addition, like in the routing system 100, the AS 205 comprises a router 210; the AS 225 comprises the routers 220, 230; and the AS 240 comprises the routers 235, 250, 255.

However, unlike in the routing system 100, the link 245 in the routing system 200 is a broadcast inter-AS TE link, not a P2P inter-AS TE link. Broadcast indicates the link 245 connects more than two points, specifically the routers 220, 230, 250. In addition, the routers 210, 220, 230, 235, 250 have local IP addresses and mask lengths associated with the links 215, 245. For instance, the router 210 has a local IP address of 10.2.1.1 and a mask length of 30 associated with the link 215, the router 220 has a local IP address of 10.1.1.3 and a mask length of 30 bits associated with the link 245, the router 230 has a local IP address of 10.1.1.2 and mask length of 30 bits associated with the link 245, the router 235 has a local IP address of 10.2.1.2 and a mask length of 30 bits associated with the link 215, and the router 250 has a local IP address of 10.1.1.1 and a mask length of 30 bits associated with the link 245. The local IP addresses are network addresses that belong to interfaces of the routers 210, 220, 230, 235, 250. The mask lengths indicate lengths of IP masks to apply to the IP addresses.

Figure 3:
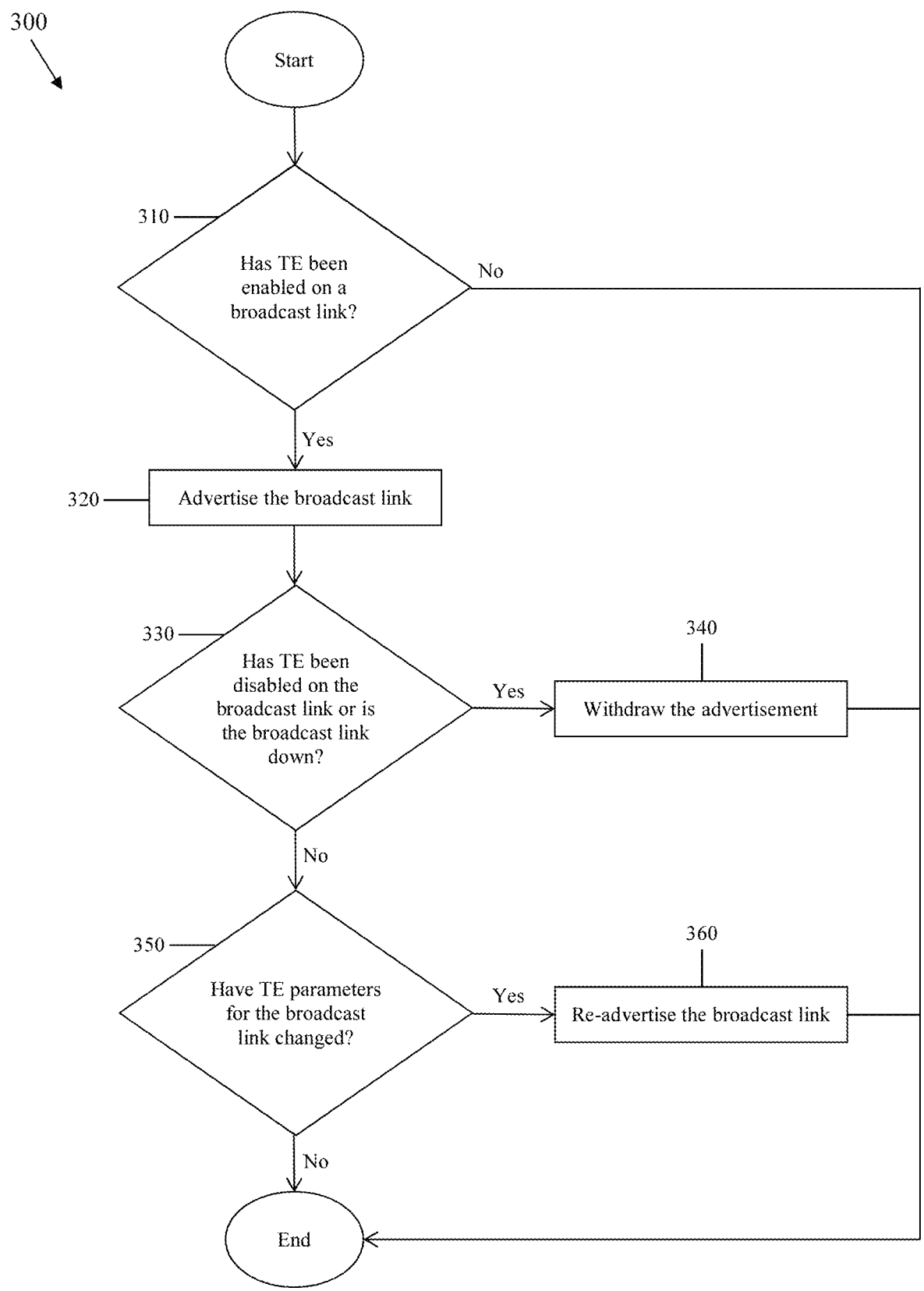
FIG. 3 is a flowchart illustrating a method of broadcast link advertisement, withdrawal, and re-advertisement according to an embodiment of the disclosure.

FIG. 3 is a flowchart illustrating a method 300 of broadcast link advertisement, withdrawal, and re-advertisement according to an embodiment of the disclosure. One of the routers 220, 230, 250, for instance the router 220, implements the method 300. At decision 310, it is determined whether TE has been enabled on a broadcast link. For instance, the router 220 determines whether TE has been enabled on the link 245 by inspecting a user's configuration of the link 245. Using an interface manager of the router 220, the user may have previously entered the configuration for storage in a memory of the router 220. If the answer is no, then the method 300 ends. If the answer is yes, then the method 300 proceeds to step 320.

Figure 4:
FIG. 4 is an inter-AS TE LSP according to an embodiment of the disclosure.
Figure 4:
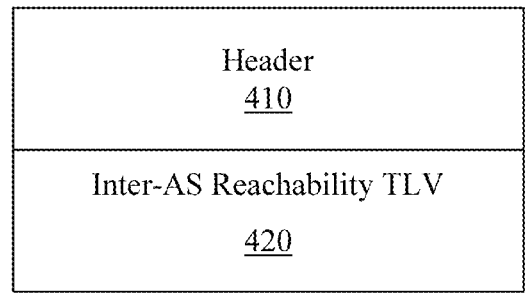
Figure 5:
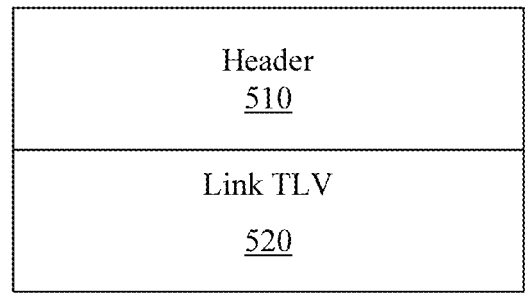
FIG. 5 is an inter-AS TE LSA according to an embodiment of the disclosure.

At step 320, the broadcast link is advertised. For instance, the router 220 transmits a link state message to its adjacent routers in the AS 225, which transmit the link state message to their adjacent routers in the AS 225. In this case, adjacent routers may mean routers that have IS-IS or OSPF adjacency. In addition, the router 230 may consider the PCE 265 as an adjacent router in the AS 225 and therefore transmit the link state message to the PCE 265. The PCE 265 may run an instance of IS-IS or OSPF for each AS 205, 225, 240 and therefore act as an adjacent router for each AS 205, 225, 240 by receiving link state messages as an adjacent router. However, the PCE 265 may not transmit link state messages as an adjacent router. The router 220 may not transmit the link state message to routers in the other ASs 205, 240. For instance, the router 220 does not transmit the link state message to the router 250 in the AS 240. The link state message comprises TE information about the link 245. If the routing system 200 implements IS-IS, then the link state message is as shown in FIG. 4. If the routing system 200 implements OSPF, then the link state message is as shown in FIG. 5. Messages may also be referred to as packets or frames.

At decision 330, it is determined whether TE has been disabled on the broadcast link or if the broadcast link is down. For instance, the router 220 determines whether TE has been disabled on the link 245 by inspecting the user's configuration of the link 245, and the router 220 determines the link 245 is down by receiving a message reporting that the link 245 is down. If the answer is no, then the method 300 proceeds to decision 350. If the answer is yes, then the method proceeds to step 340. At step 340, the advertisement is withdrawn. For instance, when the routing system 200 implements OSPF, the router 220 flushes the link state message in the AS 240 by setting an age of the link state message to a maximum age such as 3,600 seconds.

At decision 350, it is determined whether TE parameters for the broadcast link have changed. For instance, the router 220 determines whether the user's configuration of the link 245 have changed TE parameters for the link 245 such as bandwidth, or the router 220 computes current usage of resources of the link 245. If the answer is no, then the method 300 ends. If the answer is yes, then the method 300 proceeds to step 360. At step 360, the broadcast link is re-advertised. For instance, the router 220 transmits a new link state message to its adjacent routers in the AS 225. The new link state message comprises the changed TE parameters. Decisions 330, 350 may be switched and may be repeated, for instance at specified times until the broadcast link is disabled or another event occurs.

FIG. 4 is an inter-AS TE LSP 400 according to an embodiment of the disclosure. The inter-AS TE LSP 400 is an IS-IS message. The inter-AS TE LSP 400 may follow a format similar to LSPs described in T. Li, et al., "IS-IS Extensions for Traffic Engineering," RFC 5305, October 2008, which is incorporated by reference. In addition, the inter-AS TE LSP 400 comprises a header 410 and an inter-AS reachability TLV 420. The header 410 comprises an LSP ID indicating a router transmitting the inter-AS TE LSP 400. For instance, if the router 220 transmits the inter-AS TE LSP 400, then the header 410 comprises 220. Alternatively, the LSP ID is a number such as 5.5.5.5. The inter-AS reachability TLV 420 comprises sub-TLVs as described below.

FIG. 5 is an inter-AS TE LSA 500 according to an embodiment of the disclosure. The inter-AS TE LSA 500 is an OSPF message. The inter-AS TE LSA 500 may follow a format similar to the Inter-AS-TE-v2 LSA or the Inter-AS-TE-v3 LSA described in RFC 5392. In addition, the inter-AS TE LSA 500 comprises a header 510 and a link TLV 520. The header 510 comprises an advertising router number indicating a router transmitting the inter-AS TE LSA 500. For instance, if the router 220 transmits the inter-AS TE LSA 500, then the header 510 comprises 220. Alternatively, the advertising router is a number such as 5.5.5.5. The link TLV 520 comprises sub-TLVs as described below.

Both the inter-AS reachability TLV 420 and the link TLV 520 comprise sub-TLVs. The sub-TLVs comprise information about a broadcast link and include a first sub-TLV indicating a link type, a second sub-TLV indicating a local IP address and a mask length, a third sub-TLV indicating a TE metric, a fourth sub-TLV indicating a local AS number, a fifth sub-TLV indicating a maximum bandwidth, a sixth sub-TLV indicating a maximum reservable bandwidth, a seventh sub-TLV indicating an unreserved bandwidth, and an eighth sub-TLV indicating an administrative group. The first sub-TLV may further indicate that the link type is multi-access for a broadcast link such as the link 245. The second sub-TLV and the fourth sub-TLV are new sub-TLVs as described below, and the remaining sub-TLVs may be as described in D. Katz, et al., "Traffic Engineering (TE) Extensions to OSPF Version 2," RFC 3630, September 2003. The orders "first," "second," "third," "fourth," "fifth," "sixth," "seventh," and "eighth" may or may not indicate actual or relative ordering. A router, for instance the router 220, may retrieve the information from its memory via an interface manager. The inter-AS reachability TLV 420 and the link TLV 520 may omit a sub-TLV indicating a link ID and a sub-TLV indicating a remote IP address.

Figure 6:
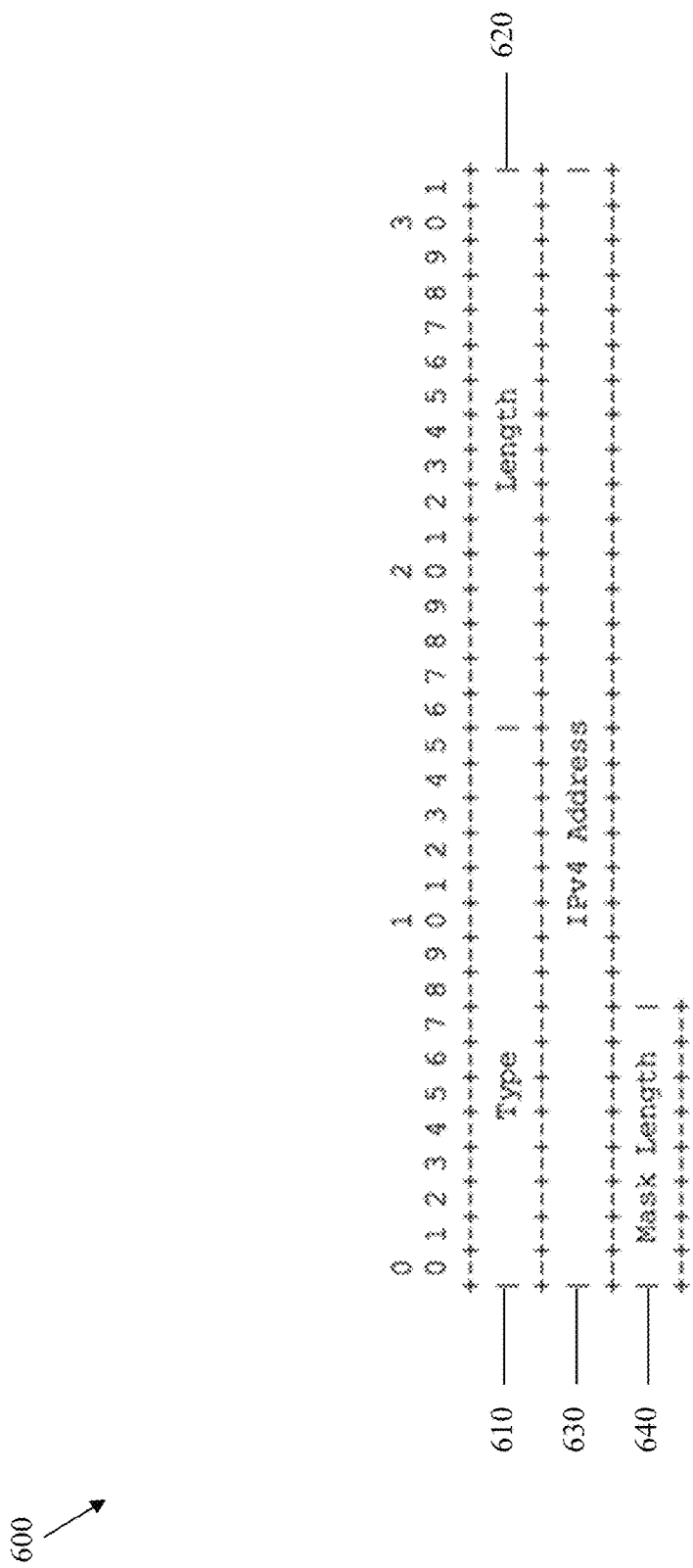
FIG. 6 is a sub-TLV according to an embodiment of the disclosure.

FIG. 6 is sub-TLV 600 according to an embodiment of the disclosure. The sub-TLV 600 is in the inter-AS reachability TLV 420 or the link TLV 520. The sub-TLV 600 comprises a type field 610 of two bytes, a length field 620 of two bytes, an IPv4 address field 630 of four bytes, and a mask length field 640 of one byte. The type field 610 is any value indicating that the sub-TLV 600 comprises a local IPv4 address with a mask length. The length field 620 indicates a sum of a length of the IPv4 address field 630 and a length of the mask length field 640. For instance, the sum is five bytes. The IPv4 address field 630 indicates a local IPv4 address of a connection to a broadcast link. For instance, if the router 220 transmits the sub-TLV 600 to its adjacent routers in the AS 225, then the IPv4 address field 630 indicates 10.1.1.3, which is the local IPv4 address of a connection of the router 220 to the link 245. The mask length field 640 indicates a length of an IPv4 address mask. For instance, if the router 220 transmits the sub-TLV 600 to its adjacent routers in the AS 225, then the mask length field 640 indicates 30.

Figure 7:
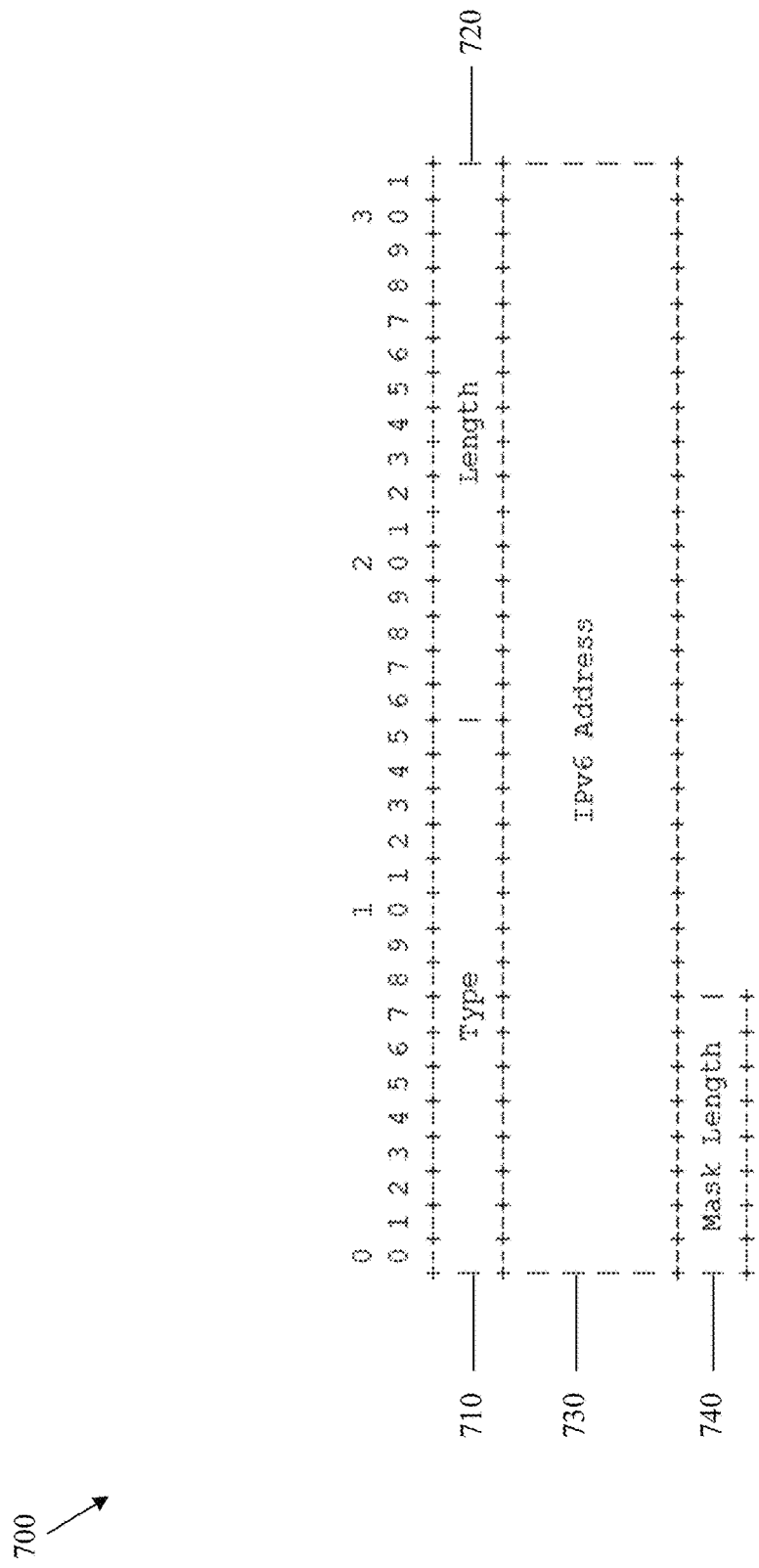
FIG. 7 is a sub-TLV according to another embodiment of the disclosure.

FIG. 7 is a sub-TLV 700 according to another embodiment of the disclosure. The sub-TLV 700 is similar to the sub-TLV 600 in FIG. 6. Specifically, like the sub-TLV 600, the sub-TLV 700 comprises a type field 710 of two bytes, a length field 720 of two bytes, and a mask length field 740 of one byte. However, unlike the sub-TLV 600, which comprises an IPv4 address field 630, the sub-TLV 700 comprises an IPv6 address field 730 of 16 bytes. The IPv6 address field 730 indicates a local IPv6 address of a connection to a broadcast link, and the mask length field 740 indicates a length of an IPv6 address mask. Together, IPv4 address masks and IPv6 address masks may be referred to as IP address masks.

Figure 8:
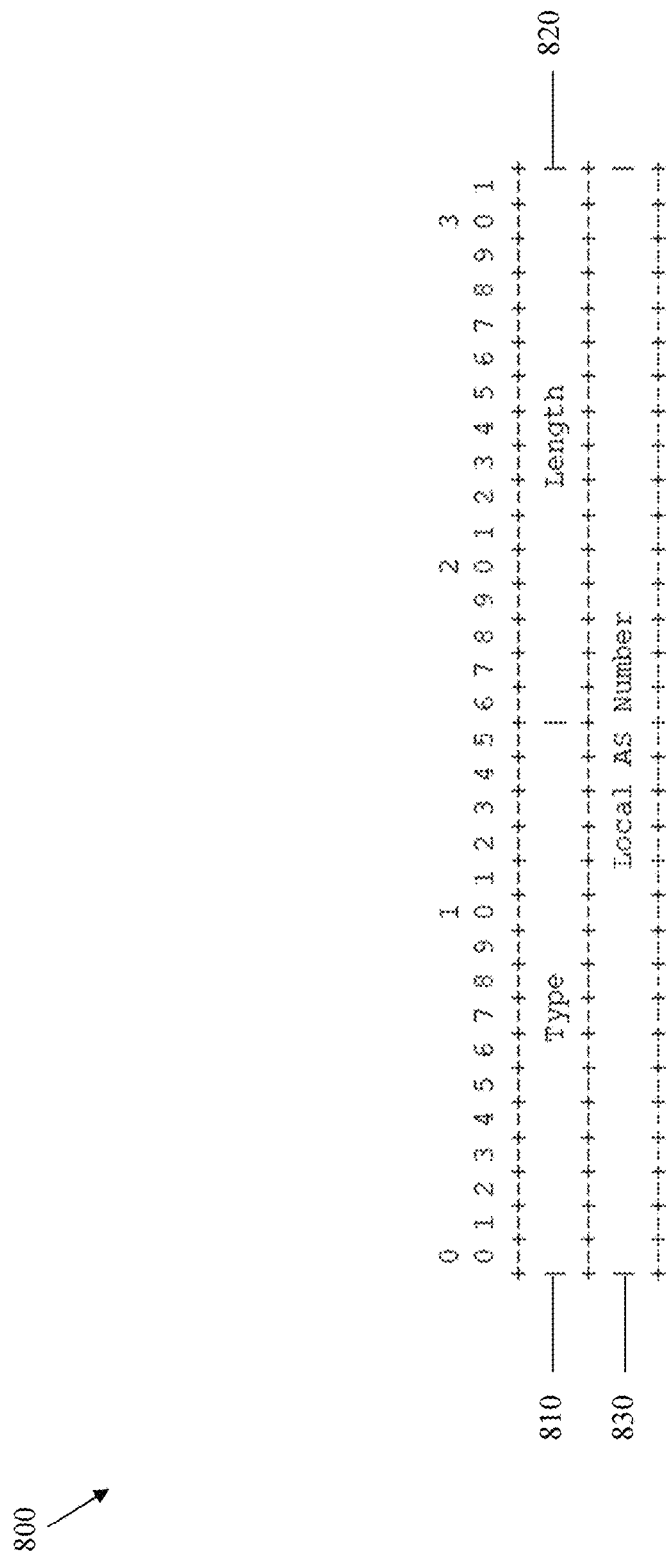
FIG. 8 is a sub-TLV according to yet another embodiment of the disclosure.

FIG. 8 is a sub-TLV 800 according to yet another embodiment of the disclosure. The sub-TLV 800 is in the inter-AS reachability TLV 420 or the link TLV 520. The sub-TLV 800 comprises a type field 810 of two bytes, a length field 820 of two bytes, and a local AS number field 830 of four bytes. The type field 810 is any value indicating that the sub-TLV 800 comprises a local AS number. The length field 820 indicates a length of the local AS number field 830. For instance, the length is four bytes. If the sub-TLV 800 is in the inter-AS reachability TLV 420, then the local AS number field 830 indicates a local AS number of an ASBR originating the inter-AS TE LSP 400. If the sub-TLV 800 is in the link TLV 520, then the local AS number field 830 indicates a local AS number of an ASBR originating the inter-AS TE LSA 500. For instance, if the router 220 transmits the sub-TLV 800 to its adjacent routers in the AS 225, then the local AS number field 830 indicates 225, which is the local AS number of the router 220.

Figure 9:
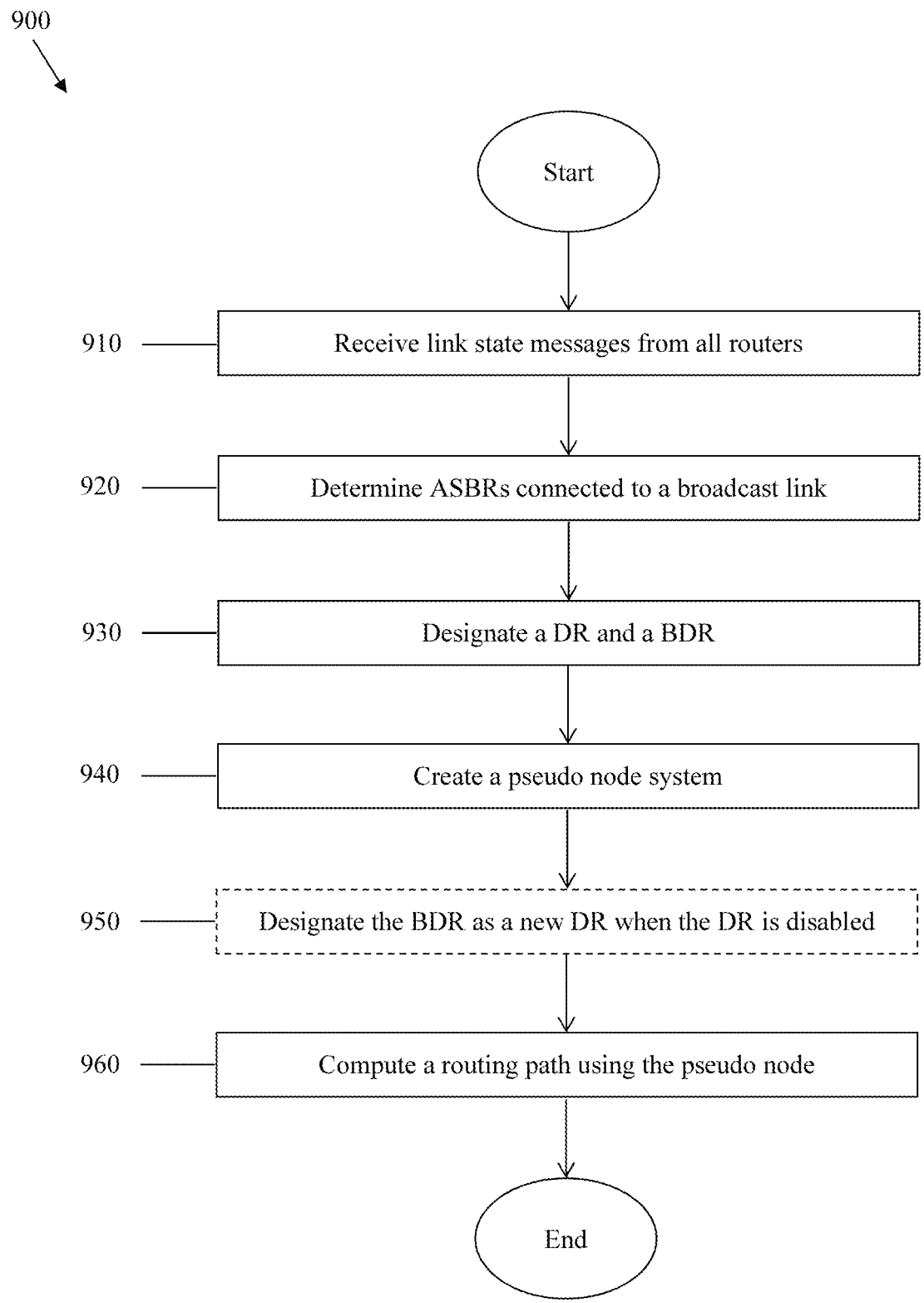
FIG. 9 is a flowchart illustrating a method of pseudo node implementation according to an embodiment of the disclosure.

FIG. 9 is a flowchart illustrating a method 900 of pseudo node implementation according to an embodiment of the disclosure. A super node, for instance the PCE 265, implements the method 900. The PCE 265 may store in a TED data received and generated in the method 900. The TED may be within the PCE 265 or in another device accessible to the PCE 265.

At step 910, link state messages are received from all routers. For instance, the PCE 265 receives the inter-AS TE LSP 400 or the inter-AS TE LSA 500 from each of the routers 210, 220, 230, 235, 250, 255. The PCE 265 does so either directly from the routers 210, 230, 255 or indirectly through paths comprising multiple routers 210, 220, 230, 235, 250, 255. Alternatively, the PCE 265 receives the link state messages from less than all of the routers 210, 220, 230, 235, 250, 255, but at least the routers 210, 220, 230, 235, 250, 255 connected to the link 245.

At step 920, ASBRs connected to a broadcast link are determined. For instance, the PCE 265 determines that the routers 220, 230, 250 are ASBRs based on a presence of flags in the link state messages. The PCE 265 then determines that the routers 220, 230, 250 are connected to the link 245 as follows. First, the PCE 265 obtains from the link state messages the local IP address 10.1.1.3 and the mask length of 30 bits for the router 220, the local IP address 10.1.1.2 and the mask length of 30 bits for the router 230, and the local IP address 10.1.1.1 and the mask length of 30 bits for the router 250. Second, the PCE 265 applies a 30-bit mask to each of those local IP addresses to obtain the same 10.1.1.0. Third, the PCE 265 determines that the routers 220, 230, 250 are part of the same link 245 because their IP addresses all result in 10.1.1.0 after application of the mask. Fourth, the PCE 265 determines that the link 245 is a broadcast link because the link state messages comprise sub-TLVs indicating the link type is multi-access.

At step 930, a DR and a BDR are designated. For instance, the PCE 265 designates as the DR the first router 220, 230, 250 that the PCE 265 receives a link state message from, and the PCE 265 designates as the BDR the second router 220, 230, 250 that the PCE 265 receives a link state message from. As an example, the PCE 265 designates the router 220 as the DR and the router 230 as the BDR. Alternatively, the PCE 265 designates the DR and the BDR based on other suitable criteria. At step 940, a pseudo node system is created.

Figure 10:
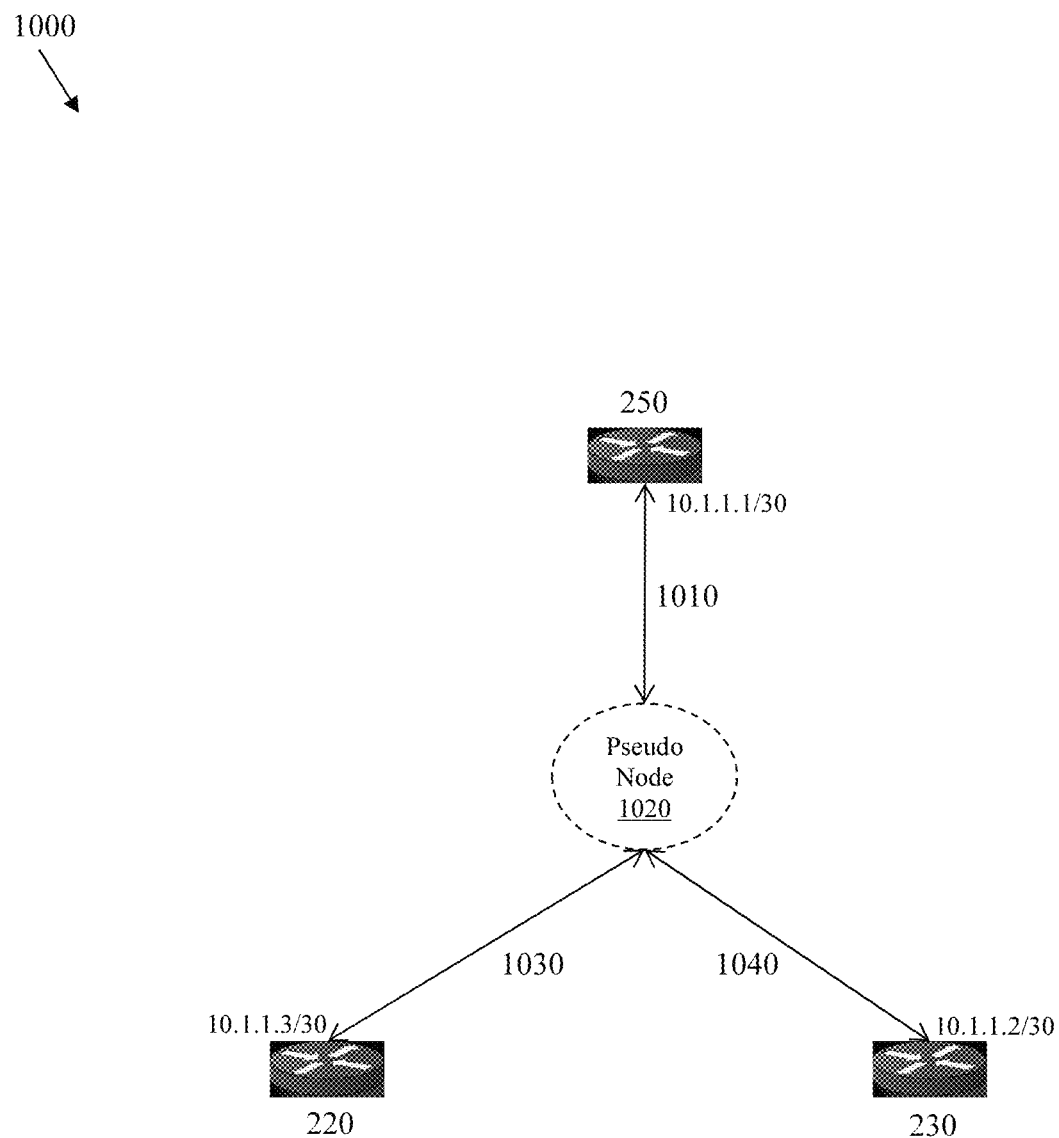
FIG. 10 is a schematic diagram of a pseudo node system according to an embodiment of the disclosure.

FIG. 10 is a schematic diagram of a pseudo node system 1000 according to an embodiment of the disclosure. The pseudo node system 1000 comprises the routers 220, 230, 250; a pseudo node 1020; and links 1010, 1030, 1040. The pseudo node 1020 is a logical construct, or virtual node, that represents a center point among the routers 220, 230, 250. The links 1010, 1030, 1040 are also logical constructs. The link 1010 connects the router 250 to the pseudo node 1020, the link 1030 connects the router 220 to the pseudo node 1020, and the link 1040 connects the router 230 to the pseudo node 1020. The pseudo node system 1000 provides a more efficient representation for the link 245, particularly if additional routers are connected to the link 245.

Returning to step 940 of FIG. 9, from the link state message from the DR, which is the router 220, the PCE 265 obtains the local IP address of 10.1.1.3 and the mask length of 30 bits. The PCE 265 applies a 30-bit mask to the local IP address of 10.1.1.3 to obtain 10.1.1.0. The PCE 265 designates 10.1.1.3 as the ID of the pseudo node 1020. The PCE 265 creates a connection via the link 1030 with the local IP address of 10.1.1.3 and the mask length of 30 bits between the router 220 and the pseudo node 1020. Likewise, the PCE 265 creates a connection via the link 1010 with the local IP address of 10.1.1.1 and the mask length of 30 bits between the router 250 and the pseudo node 1020, and the PCE 265 creates a connection via the link 1040 with the local IP address of 10.1.1.2 and the mask length of 30 bits between the router 230 and the pseudo node 1020.

At step 950, the BDR is designated as a new DR when the DR is disabled. For instance, the router 220 is disabled due to its removal from the routing system 200, its powering down, or another cause. The PCE 265 designates the router 230 as the new DR. In addition, from among the remaining routers connected to the link 245, the PCE 265 designates as a new BDR the router with the smallest local IP address or the largest local IP address. In this case, the router 250 is the only remaining router, so it has either the smallest local IP address or the largest local IP address and therefore becomes the new BDR. Furthermore, the PCE 265 removes the links 1010, 1030, 1040 associated with the disabled DR. For instance, the PCE 265 removes the link 1030. Step 950 is optional and may not necessarily occur. If step 950 occurs, it may not occur after step 940, but may instead occur at any other time when the DR is disabled.

Finally, at step 960, a path is computed using the pseudo node. For instance, the PCE 265 computes a routing path using the pseudo node 1020. Computing the routing path using the pseudo node 1020 provides for more efficient computation in the PCE 265.

Figure 11:
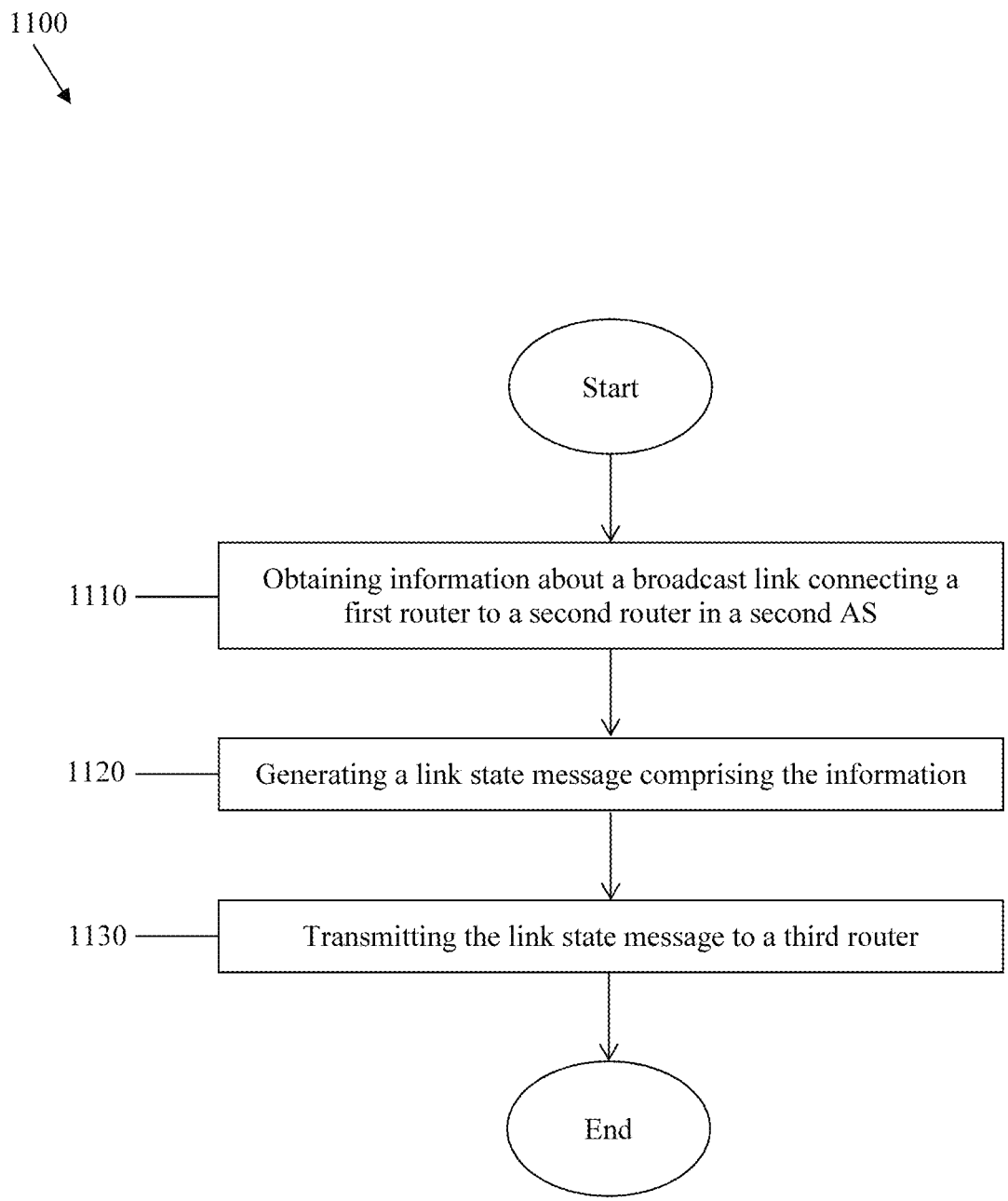
FIG. 11 is a flowchart illustrating a method of broadcast link advertisement according to an embodiment of the disclosure.

FIG. 11 is a flowchart illustrating a method 1100 of broadcast link advertisement according to an embodiment of the disclosure. A router, for instance the router 220 in the AS 225, implements the method 1100. At step 1110, information about a broadcast link connecting a first router to a second router in a second AS is obtained. The first router is in a first AS. For instance, the router 220 obtains information about the link 245, which connects the router 220 in the AS 225 to the router 250 in the AS 240. The information comprises any combination of the IPv4 address field 630, mask length field 640, the IPv6 address field 730, the mask length field 740, the local AS number field 830, or the other sub-TLV information described above.

At step 1120, a link state message comprising the information is generated. For instance, the router 220 generates the inter-AS TE LSP 400 or the inter-AS TE LSA 500. Finally, at step 1130, the link state message is transmitted to a third router. The third router is in the first AS and is adjacent to the first router.

Figure 12:
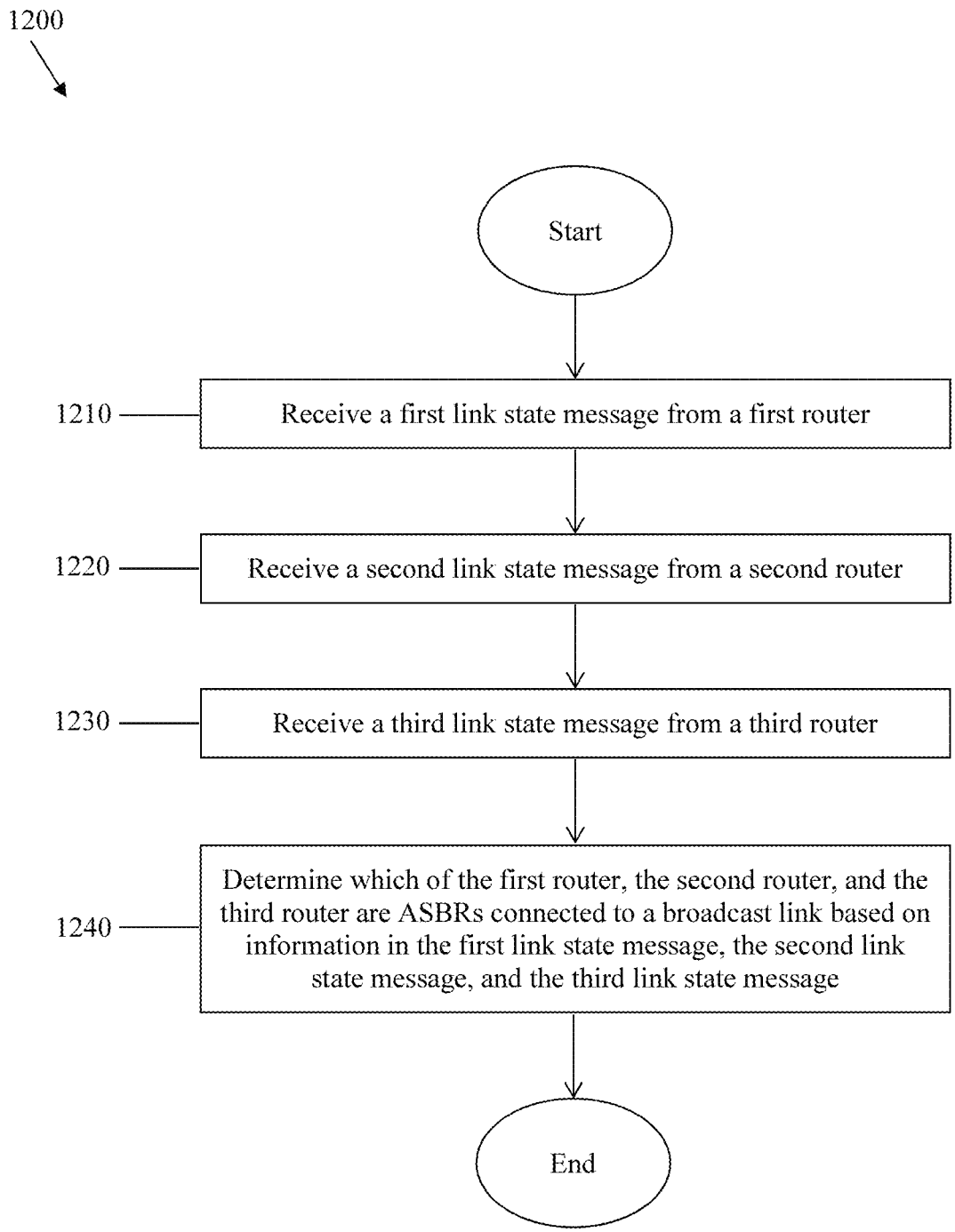
FIG. 12 is a flowchart illustrating a method of pseudo node implementation according to another embodiment of the disclosure.

FIG. 12 is a flowchart illustrating a method 1200 of pseudo node implementation according to another embodiment of the disclosure. A super node, for instance the PCE 265, implements the method 1200. The PCE 265 may do so using a TED.

At step 1210, a first link state message is received from a first router. For instance, the PCE 265 receives the inter-AS TE LSP 400 or the inter-AS TE LSA 500 from the router 220. At step 1220, a second link state message is received from a second router. For instance, the PCE 265 receives the inter-AS TE LSP 400 or the inter-AS TE LSA 500 from the router 230. At step 1230, a third link state message is received from a third router. For instance, the PCE 265 receives the inter-AS TE LSP 400 or the inter-AS TE LSA 500 from the router 250.

Finally, at step 1240, it is determined which of the first router, the second router, and the third router are ASBRs connected to a broadcast link based on information in the first link state message, the second link state message, and the third link state message. For instance, the PCE 265 determines which of the routers 220, 230, 250 are ASBRs connected to the link 245 and determines that the link 245 is a broadcast link. The PCE 265 may do so as described with respect to step 920 in FIG. 9.

Figure 13:
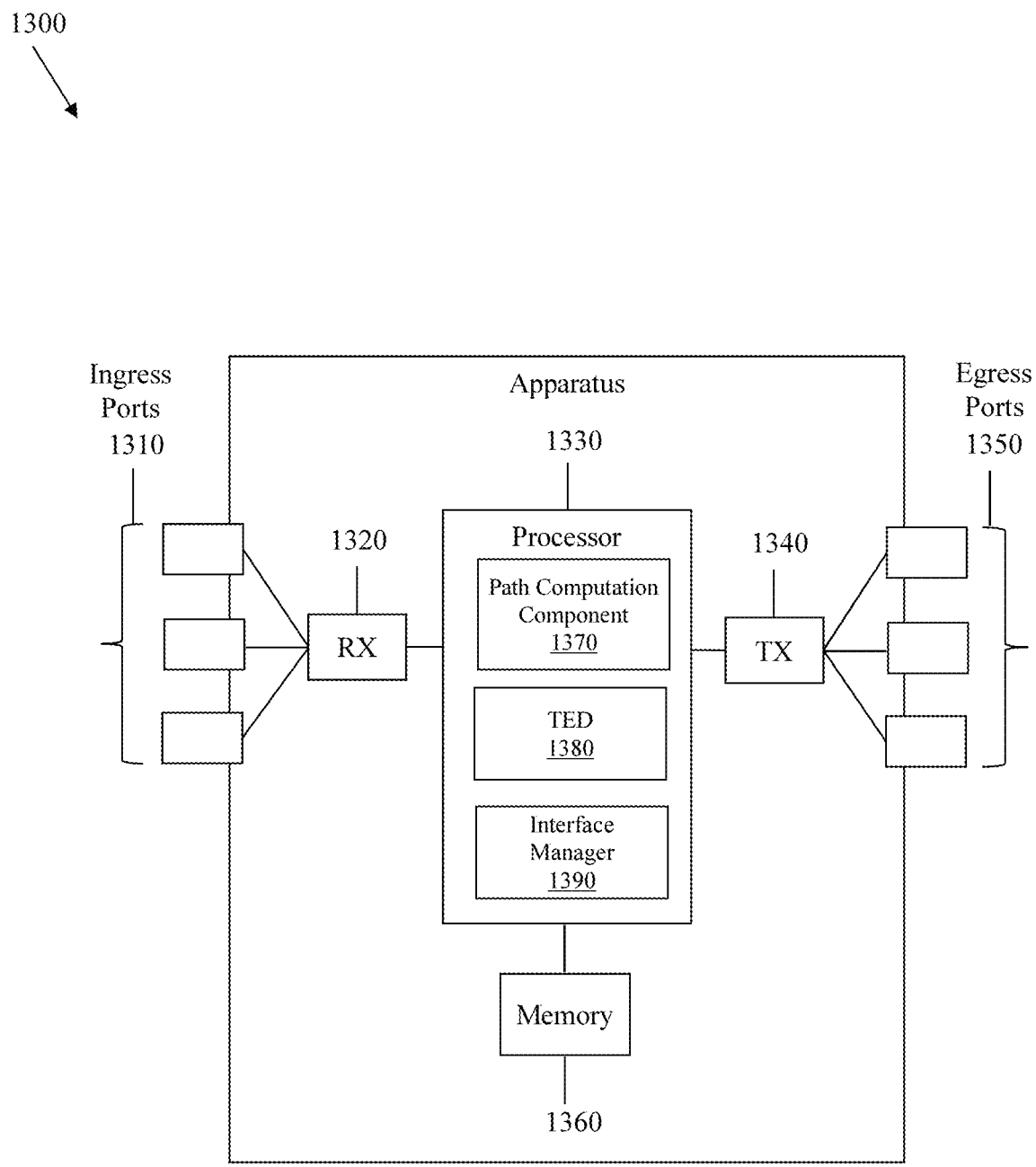
FIG. 13 is a schematic diagram of an apparatus according to an embodiment of the disclosure.

FIG. 13 is a schematic diagram of an apparatus 1300 according to an embodiment of the disclosure. The apparatus 1300 may implement the disclosed embodiments. The apparatus 1300 comprises ingress ports 1310 and an RX 1320 for receiving data; a processor, logic unit, baseband unit, or CPU 1330 to process the data; a TX 1340 and egress ports 1350 for transmitting the data; and a memory 1360 for storing the data. The apparatus 1300 may also comprise OE components, EO components, or RF components coupled to the ingress ports 1310, the RX 1320, the TX 1340, and the egress ports 1350 for ingress or egress of optical, electrical signals, or RF signals.

The processor 1330 is any combination of hardware, middleware, firmware, or software. The processor 1330 comprises any combination of one or more CPU chips, cores, FPGAs, ASICs, or DSPs. The processor 1330 communicates with the ingress ports 1310, RX 1320, TX 1340, egress ports 1350, and memory 1360. The processor 1330 comprises a path computation component 1370, a TED 1380, and an interface manager 1390, which implement the disclosed embodiments. The inclusion of the path computation component 1370, the TED 1380, and the interface manager 1390 therefore provides a substantial improvement to the functionality of the apparatus 1300 and effects a transformation of the apparatus 1300 to a different state. Alternatively, the memory 1360 stores the path computation component 1370, the TED 1380, and the interface manager 1390 as instructions, and the processor 1330 executes those instructions.

The memory 1360 comprises any combination of disks, tape drives, or solid-state drives. The apparatus 1300 may use the memory 1360 as an over-flow data storage device to store programs when the apparatus 1300 selects those programs for execution and to store instructions and data that the apparatus 1300 reads during execution of those programs. The memory 1360 may be volatile or non-volatile and may be any combination of ROM, RAM, TCAM, or SRAM.

A first router in a first AS, the first router comprises: a processing element configured to: obtain information about a broadcast link connecting the first router to a second router in a second AS, and generate a link state message comprising the information; and a transmitting element coupled to the processing element and configured to transmit the link state message to a third router, wherein the third router is in the first AS and is adjacent to the first router.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A first router in a first autonomous system (AS), the first router comprising:
    a processor configured to execute computer instructions to:
        obtain information about a broadcast link connecting the first router to a second router in a second AS,
        generate a link state message comprising the information in a first sub-type, length, and value (sub-TLV) and a second sub-TLV, wherein the second sub-TLV comprises a local AS number field indicating a local AS number of the first router, and wherein the local AS number is a number of the first AS,
        determine whether traffic engineering (TE) has been disabled on the broadcast link or whether the broadcast link is down, and
        withdraw the link state message in the first AS when the TE is disabled on the broadcast link or when the broadcast link is down; and
    a transmitter coupled to the processor and configured to transmit the link state message to a third router when the TE is enabled on the broadcast link,
    wherein the third router is in the first AS.

2. The first router of claim 1, wherein the first sub-TLV comprises an Internet Protocol (IP) address field and a mask length field, wherein the IP address field indicates a local IP address of a connection to the broadcast link, and wherein the mask length field indicates a length of an IP address mask.

3. The first router of claim 1, wherein the link state message is an Intermediate System to Intermediate System (IS-IS) link state protocol data unit (LSP).

4. The first router of claim 1, wherein the link state message is an Open Shortest Path First (OSPF) link state advertisement (LSA).

5. The first router of claim 1, wherein when TE parameters for the broadcast link have changed:
    the processor is further configured to generate a new link state message; and
    the transmitter is further configured to transmit the new link state message to the third router.

6. The first router of claim 1, wherein an AS is a group of routers that appears to other ASes to have a single, coherent interior routing plan and presents a consistent picture of what networks are reachable through the AS.

7. The first router of claim 1 wherein the third router is adjacent to the first router in the first AS.

8. A method implemented in a first router in a first autonomous system (AS), the method comprising:
    obtaining information about a broadcast link connecting the first router to a second router in a second AS;
    generating a link state message comprising the information in a first sub-type, length, and value (sub-TLV) and a second sub-TLV, wherein the first sub-TLV comprises a mask length field, and wherein the second sub-TLV comprises a local AS number field indicating a local AS number of the first router, and wherein the local AS number is a number of the first AS;
    determining whether traffic engineering (TE) has been enabled on the broadcast link; and
    transmitting the link state message to a third router that is in the first AS when the TE is enabled on the broadcast link.

9. The method of claim 8, wherein the link state message is an Intermediate System to Intermediate System (IS-IS) link state protocol data unit (LSP).

10. The method of claim 8, wherein the link state message is an Open Shortest Path First (OSPF) link state advertisement (LSA).

11. The method of claim 8, further comprising flushing the link state message in the first AS when the TE is disabled on the broadcast link.

12. The method of claim 8, wherein when TE parameters for the broadcast link have changed, the method further comprises:
    generating a new link state message; and
    transmitting the new link state message to the third router.

13. The method of claim 8, wherein an AS is a group of routers that appears to other ASes to have a single, coherent interior routing plan and presents a consistent picture of what networks are reachable through the AS.

14. A method implemented by a super node, the method comprising:
    receiving a first link state message from a first router;
    receiving a second link state message from a second router;
    receiving a third link state message from a third router; and
    determining which of the first router, the second router, and the third router are autonomous system border routers (ASBRs) connected to a broadcast link based on information in the first link state message, the second link state message, and the third link state message,
    wherein the information comprises a local autonomous system (AS) number field indicating an AS number and comprises a mask length field, and
    wherein the local AS number field and the mask length field are in at least one sub-type, length, and value (sub-TLV).

15. The method of claim 14, wherein the first link state message, the second link state message, and the third link state message are either Intermediate System to Intermediate System (IS-IS) link state protocol data units (LSPs) or Open Shortest Path First (OSPF) link state advertisements (LSAs).

16. The method of claim 14, further comprising:
    designating a designated router (DR) and a backup DR (BDR) from among the first router, the second router, and the third router;
    creating a pseudo node system using the first router, the second router, and the third router, wherein the pseudo node system comprises a pseudo node; and
    computing a routing path using the pseudo node.

17. The method of claim 14, wherein the super node is a path computation element (PCE).

18. The method of claim 14, wherein an ASBR is a router at a border of an AS.

19. The method of claim 18, wherein an AS is a group of routers that appears to other ASes to have a single, coherent interior routing plan and presents a consistent picture of what networks are reachable through the AS.

20. The method of claim 14, wherein the information further comprises an Internet Protocol (IP) address field indicating a local IP address of a connection to the broadcast link, and wherein the mask length field indicates a length of an IP address mask.

\* \* \* \* \*